United States Patent [19]
VanDenberg

[11] Patent Number: 5,882,031
[45] Date of Patent: Mar. 16, 1999

[54] VEHICLE SUSPENSION SYSTEM

[75] Inventor: Ervin K. VanDenberg, Massillon, Ohio

[73] Assignee: Meritor Heavy Vehicle Systems, LLC, Troy, Mich.

[21] Appl. No.: 823,229

[22] Filed: Mar. 24, 1997

Related U.S. Application Data

[63] Continuation of Ser. No. 767,102, Dec. 6, 1996, Pat. No. 5,718,445, which is a continuation of Ser. No. 295,243, Aug. 24, 1994, abandoned.

[51] Int. Cl.$^6$ .................................................. B60G 5/00
[52] U.S. Cl. ..................................... 280/683; 280/124.116
[58] Field of Search ........................... 280/124.116, 678, 280/683

[56] References Cited

U.S. PATENT DOCUMENTS

| | | | |
|---|---|---|---|
| 3,140,880 | 7/1964 | Masser | 280/124.108 |
| 4,114,923 | 9/1978 | Raidel | 280/124.116 |
| 4,132,432 | 1/1979 | Raidel | 280/86.75 |
| 4,202,564 | 5/1980 | Strader | 280/678 |
| 4,309,045 | 1/1982 | Raidel | 280/124.116 |
| 4,530,515 | 7/1985 | Raidel | 280/683 |
| 4,756,550 | 7/1988 | Raidel | 280/683 |
| 5,083,812 | 1/1992 | Wallace et al. | 280/124.106 |

Primary Examiner—Kenneth R. Rice

[57] ABSTRACT

A vehicle suspension system having a pair of hanger brackets. A first intermediate bracket dependent from a vehicle, a second intermediate bracket a pair of control arms, and a torque rod. One end of each control arm is pivotally mounted on a corresponding hanger bracket. Another end of each control arm, is pivotally attached to an axle seat. The torque arm is pivotally mounted between the first and second intermediate brackets. One end of a stabilizer bar is mounted to each control arm to increase the suspensions roll stability, and resistance to lateral deflection. In one embodiment, the stabilizer bar extends through a hole formed in each control arm, and in other embodiments, flanges extend outwardly from the stabilizer bar adjacent respective control arms for mounting the stabilizer bar to the control arms. In yet another embodiment, the stabilizer bar includes a pair of telescopically engaged square hollow tubes, with the inner tube offset with respect to the outer tube, and a plurality of bushings extend longitudinally therebetween. The pivotal connections on either end of the control arm include a flexible bushing formed with a hole, and a pivot pin extending through the hole.

15 Claims, 8 Drawing Sheets

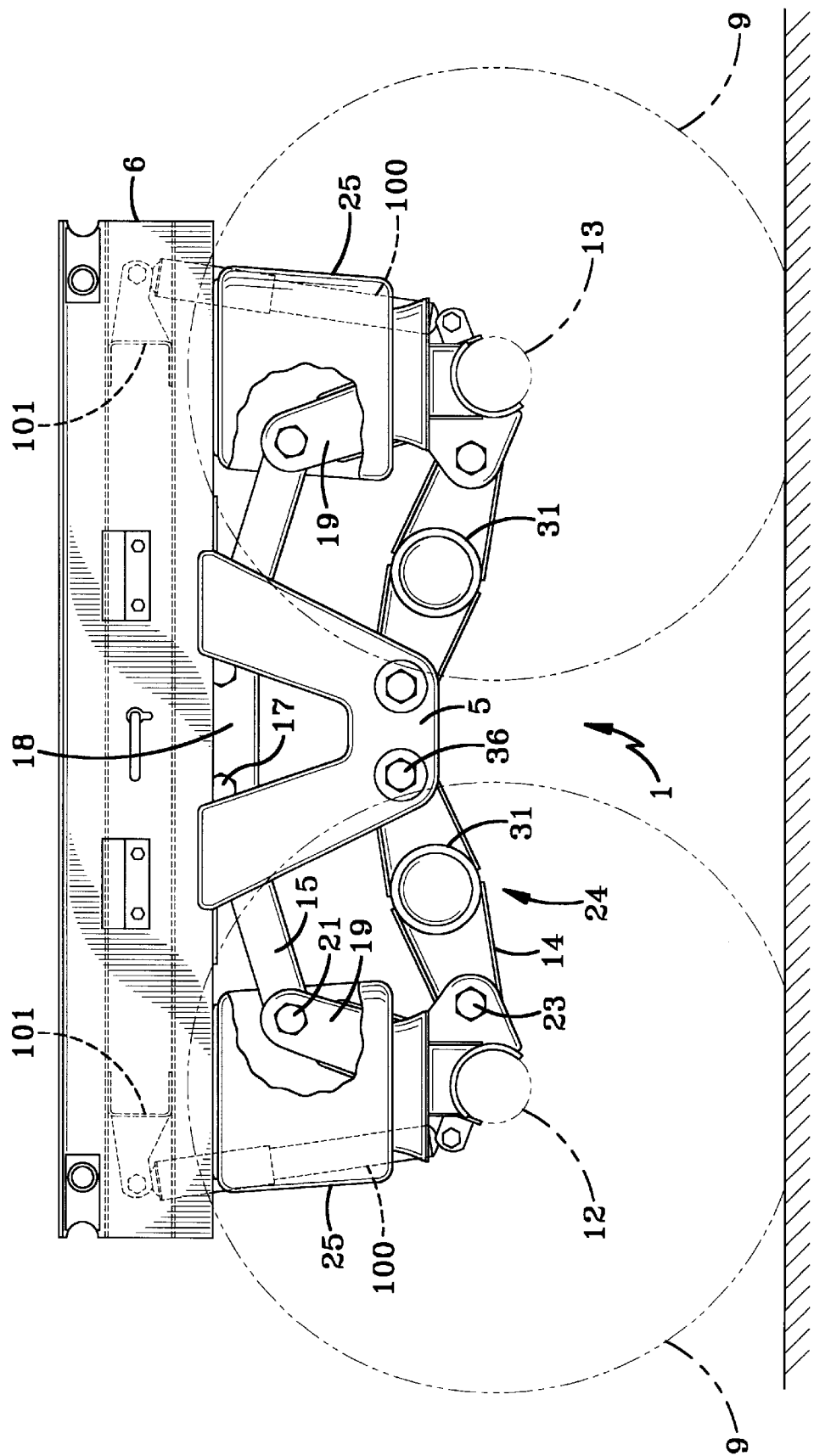

VEHICLE SUSPENSION SYSTEM

CROSS REFERENCE TO RELATED APPLICATIONS

The present application is a continuation of application Ser. No. 08/767,102, filed Dec. 6, 1996, U.S. Pat. No. 5,718,445, which is a continuation of application Ser. No. 08/295,243, filed Aug. 24, 1994, now abandoned.

BACKGROUND OF THE INVENTION

1. Technical Field

The invention relates generally to an improved vehicle suspension system. More particularly, the invention relates to air spring suspension systems for land vehicles which include a parallelogram kinematic movement. Specifically, the invention relates to a parallelogram suspension system which is roll stable and resistant to lateral deflection.

2. Background Information

Suspensions are available in the prior art which utilize air springs to provide a comfortable ride, even for large over-the-road trucks and other heavy vehicles. The air springs are typically used in industrial vehicle single axle units tandem or multi-axle arrangements of two or more axles which are either driven or non-driven.

One drawback of air spring suspensions is that an air spring is essentially an air inflated bag and requires auxiliary stabilization. An air suspended axle must have separate independent mechanical location and attitude controls and stabilized components or it will not function. Absent stabilization, the air spring will extend to its maximum length or width in the direction of least resistance. Also, uneven transverse load distribution on a vehicle supported on unstable air springs will cause vehicle lean and tip-over.

A significant number of air spring suspensions have been developed which to a greater or lessor extent, control axle location and attitude. A number of suspensions that have been developed are roll rigid, while others are roll flexible, each generally being designed for a specific application. The most common roll rigid configuration is the trailing beam type suspension, most of which use the axle as a torsion rod to provide roll rigidity.

Another type of suspension which has been developed is the parallelogram suspension which is not inherently roll rigid, and does not inherently provide lateral stiffness. Again, ancillary devices such an anti-roll bars, track bars or guide mechanisms have been utilized to stabilize typical parallelogram designs. As such, parallelogram type suspensions, even with the ancillary devices attached, were often only suitable for low center of gravity loads, or on specialized vehicles stabilized by other vehicle suspension mechanisms.

Trailing arm suspensions are brake reactive. That is, when the vehicle brakes are applied, the suspension will tend to compress thereby reducing the suspensions effectiveness. Similarly, when the brakes are applied as the vehicle moves in reverse, the suspension will tend to raise up, and pivot about the single trailing arm pivot, again reducing the suspensions effectiveness. Further, most trailing arm suspensions suffer from dock walk such that they move toward or away from the loading dock as the suspension moves up or down with the brakes locked. This movement is caused from air draining off the air springs, or as a result of loads added to or removed from the vehicle, or the temperature changes that occur as the trailer remains parked by the dock. Dock walk occurs, primarily because of rotation of the beam, axle and tire assembly when the brakes are locked. As the suspension travels vertically with the brakes locked it rotates the tires causing the tires to move the vehicle horizontally. If the trailer is positioned adjacent a dock, it causes the trailer to move toward or away from the dock as a result of the movement or rotation about the single pivot point.

Similarly, trailing arm suspensions do not utilize the air springs full capacity as the air spring plates are not parallel in extreme operating positions, again as a result of the trailing arm pivoting about a single pivot point.

Parallelogram suspensions were developed to solve a number of the problems associated with trailing arm type suspensions. However, parallelogram suspensions create problems not present in trailing arm type suspensions. Specifically, parallelogram suspensions are not inherently roll rigid or provide lateral stiffness. Parallelogram suspensions have been found to be a significant advancement over the prior art as they provide a relatively stable, safe, and comfortable ride for all types of loads. Some of these parallelogram suspensions are included in U.S. Pat. Nos. 4,114,923, 4,132,432 and 4,309,045.

Advantages of the parallelogram type air spring suspensions include that the air suspended axle in a parallelogram suspension moves a very short linear distance between the loaded and unloaded positions and has no rotational component to the motion. This reduces the problem of dock walk inherent in trailing arm type suspensions.

Further, the parallelogram stabilized suspension permits the air spring's full-load capacity to be utilized. The top and bottom air spring plates remain substantially parallel throughout the full range of air spring travel whether the vehicle is fully loaded or unloaded. Specifically, when the air spring is mounted on the parallel moving link of the parallelogram it allows the utilization of the air springs full travel and full load capacity. In comparison, in the typical trailing arm design where the air spring travels in an arc and "fans" open stretching the rearmost fibers of the spring while not utilizing even the full travel of the forward part of the air spring.

Yet a further advantage of the parallelogram suspension is its inherent ability to maintain a constant caster angle for steerable or caster steering axles which are often utilized in auxiliary axle suspensions for tractors and trailers.

Parallelogram type suspensions are also typically not brake free active. That is, they do not dive or raise when brake torque is applied to the suspension system.

The parallelogram suspension inherently provides the above advantages, and also locates the axle relative to the longitudinal axis of the vehicle by controlling the forward and rearward motion of the axle relative to the frame. Moreover, a parallelogram suspension also controls the path which the air spring follows as it operates to take up irregularities in the road surface. However, the parallelogram suspension alone does not stabilize the air spring. Specifically, the parallelogram itself does not provide lateral stability to the suspension system.

Lateral forces act on a suspension system in a variety of ways with the most common being that lateral forces act on a suspension as the vehicle negotiates a turn. As the vehicle turns, shear stresses act between the tire and the road surface causing a lateral stress to be transferred through the tire-wheel assembly to the axle. The axle, being rigidly attached to the suspension, transfers the lateral forces into the parallelogram causing it to laterally deflect. This lateral deflection can be extreme and substantially limits the usage of parallelogram suspensions. Lateral force may be strong enough under certain loading conditions that the tires contact the vehicle frame rails.

It is thus necessary to provide mechanical means for controlling lateral forces on the suspension and its various members. One typical non-parallelogram type suspension where lateral forces are mechanically controlled is shown in U.S. Pat. No. 3,140,880 to Maser in which air springs are disposed between two vertically swinging control arms to which the axle is also attached. One feature of this suspension is that much of the lateral force is controlled by a strong, relatively rigid attachment between the axle and the control arms. As such, the lateral force is taken up by the attachment between the control arm and the axle. While the suspension system of this patent presumably functioned for the purpose for which it was intended, it suffered from dock walk, brake reactivity, and did not utilize the full load carrying capacity of the air spring. Moreover, it is desirable to provide for greater flexibility between the axle and the control arms, while still maintaining sufficient lateral stability and thus increase the suspensions roll stability. Thus, the second problem inherent in parallelogram air spring suspensions is that they are not roll stable.

Roll instability refers to the counteracting forces operating on the ends of an axle causing one end of the axle to raise relative to the frame a distance greater than the other end of the axle. Roll instability is encountered when the vehicle frame tilts or rolls relative to the axle; for example, when the vehicle negotiates a turn such that the centrifugal and acceleration forces reduce the downward forces acting on the inside wheel of the turn, and increase the downward force acting on the outside wheel of the turn. Roll instability is also realized when the axle moves relative to the frame; for example, during diagonal axle walk.

Diagonal axle walk occurs when the axle moves relative to the vehicle frame which occurs when the wheels at the opposite ends of the axle encounter unlike irregularities in a road or off-the-road surface, such as when one wheel rides over a curb. As the wheel rides over the curb or bump, an upward force acts on that wheel, and a counteracting downward force acts on the wheel not riding over the curb. If the suspension is unable to provide flexibility between the axle and the frame as the tire-wheel assembly travels over the curb or ground irregularity, or alternatively to provide flexibility between the axle and the frame as the vehicle negotiates a turn, the suspension will be too roll rigid, and may cause axle breakage or over stress vehicle components such as the frame. Roll rigid suspensions are used to stabilize high center of gravity vehicles like highway trailers, and are most critical in applications such as tank or dump trailers and vans having high volume boxes and thus a relatively high center of gravity. In these applications, only enough roll compliance is permitted to allow the axle suspension combination to negotiate uneven terrain without unduly stressing the vehicle frame or axle. Typically, the roll angles of axle to frame are limited to 2 to 3 degrees in roll rigid suspensions. That is, if all the load were transferred to the tire or tires on one side of the vehicle and the tire or tires on the other side of the vehicle are completely off the ground, the angle of the axle relative to the frame reaches only about 2 to 3 degrees for a typical roll rigid suspension.

Conversely, roll flexible suspensions are used on low height vehicles and multi-axle vehicles which are stabilized by only some of the suspensions and only want to increase the load carrying capacity of the unit with the addition of a flexible suspension. In these applications where tractive effort is paramount, the suspension must be flexible to allow the tires to remain in contact with the ground. Specifically, if a suspension is added to provide an increased total vehicle weight, it is often beneficial for the suspension to be relatively flexible. This flexibility ensures that the tires remain in ground contact to assure that the increased carrying capacity of the axle is evenly transmitted through the frame to the ground, without inducing undue stress in the vehicle frame structure. Regardless of whether a roll rigid or roll flexible suspension is utilized, the suspension must be roll stable and provide the proper roll and lateral control needed to assure that the total vehicle is stable.

Attempts have been made to provide additional resistance to lateral forces while simultaneously allowing the frame to "roll" in a controlled manner relative to the axle without regard to the vertical loads supported by the air springs. Prior attempts to provide additional roll resistance include the addition of stabilizer bars, roll bars or torsion bars secured between the suspension and the frame, or by stiffening the connection between the axle and the control arm as described above in typical trailing beam suspensions. One such suspension is shown in U.S. Pat. No. 5,083,812.

Such improvements, however, may nevertheless affect the handling and ride of the vehicle, and transfer the load caused by the lateral or roll control forces to the frame thereby overstressing vehicle components. Such systems are frequently more complex, having many moving components, and may also have limited application, especially where the vehicle center of gravity is over a predetermined height.

Therefore, a need exists for an air spring suspension which is parallelogram stabilized and is roll stable, but which is also resistant to deflection from lateral forces.

SUMMARY OF THE INVENTION

Objectives of the invention include providing a vehicle suspension system which includes kinematic parallelogram movement.

Another objective is to provide a parallelogram suspension which is resistant to lateral forces.

A further objective is to provide a parallelogram suspension which is roll stable.

A still further objective is to provide a pair of a parallelogram type suspensions which oppose each other when installed on a vehicle frame.

Yet another objective is to provide a parallelogram type air spring suspension which will operate equally well on most vehicles.

A still further objective is to provide such a vehicle suspension system which is of simple construction, which achieves the stated objectives in a simple, effective and inexpensive manner, and which solves problems and satisfies needs existing in the art.

These and other objectives and advantages of the invention are obtained by the improved vehicle suspension system, the general nature of which may be stated as including a pair of parallel and spaced apart parallelogram means for at least partially stabilizing on axle relative to a frame and adapted to extend between an axle and a frame; spring means for resiliently controlling the vertical movement of an axle relative to a frame adapted to extend between a frame and an axle; a stabilizer bar having a first end and a second end extending between said pair of parallelogram means; and mounting means for mounting one of said first and second ends to each parallelogram means.

BRIEF DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

FIG. 8A is a fragmentary cross-sectional view taken along line 8A—8A, FIG. 8;

FIG. 10 is a side elevational view of the suspension of FIG. 9 in the raised position. Similar numerals refer to similar parts throughout the drawings.

DESCRIPTION OF THE PREFERRED EMBODIMENTS

Figure 1:
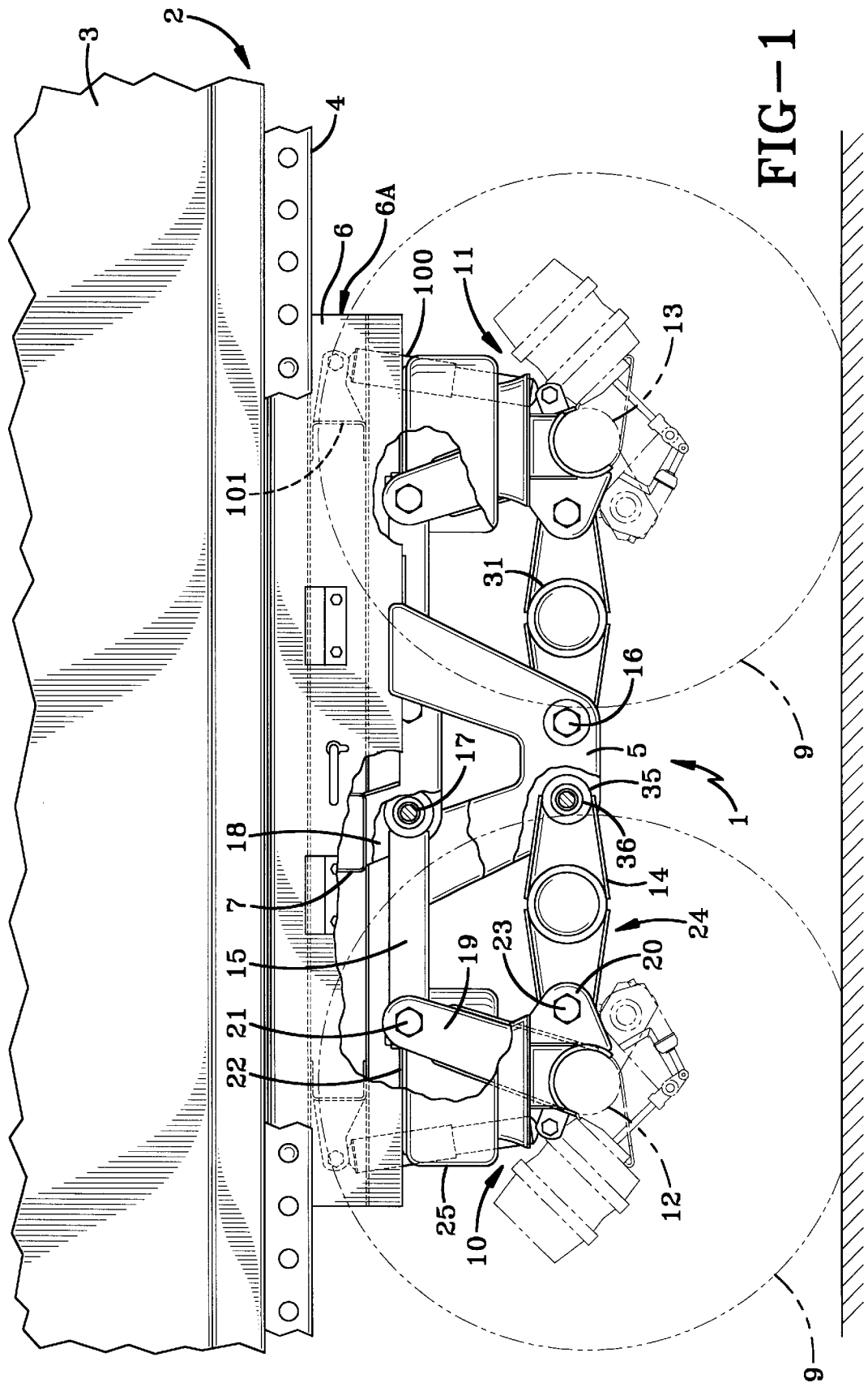
FIG. 1 is a side elevational view of the vehicle suspension system with the tires and brake assemblies shown in dot-dash lines attached to a vehicle.
Figure 2:
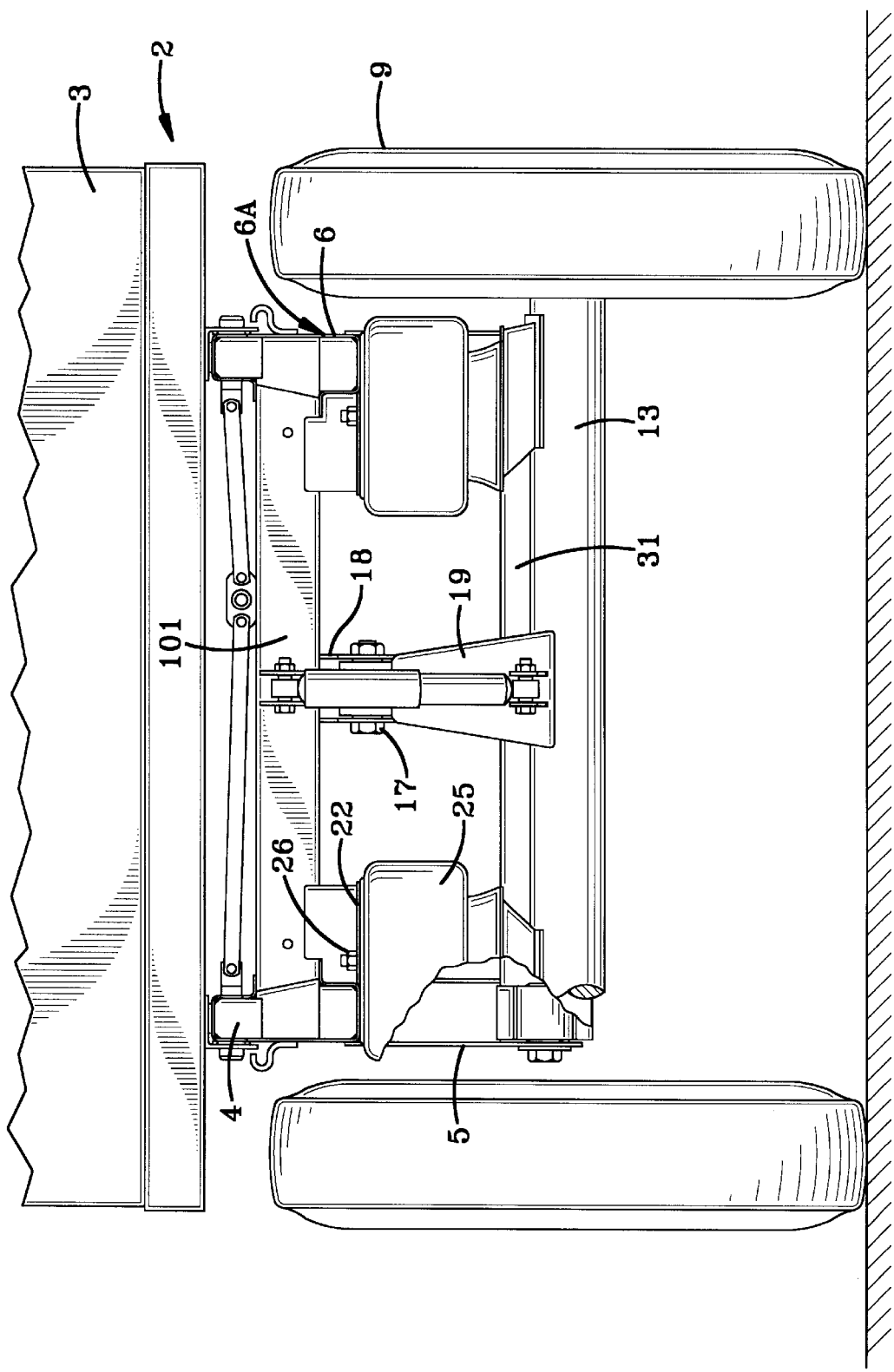
FIG. 2 is a rear elevational view of the vehicle suspension system shown in FIG. 1 with portions broken away.
Figure 3:
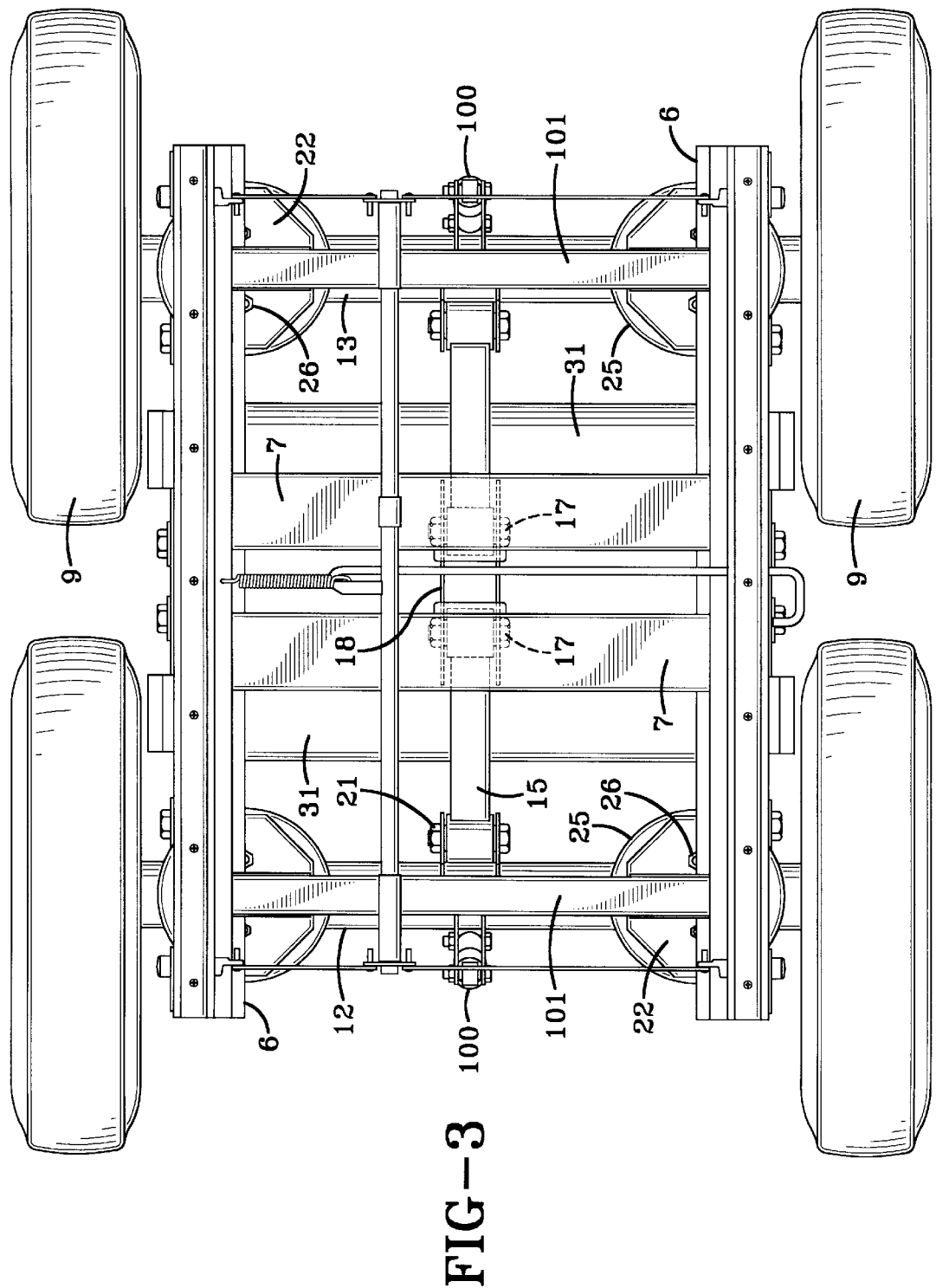
FIG. 3 is a top plan view of the suspension system shown in FIG. 1.

The improved vehicle suspension system of the present invention is indicated generally at 1, and is particularly shown in FIGS. 1, 2 and 3, and is shown mounted on a vehicle 2, such as a truck or trailer. Vehicle 2 includes a cargo box 3 supported by a pair of frame rails 4 extending longitudinally along the length of vehicle 2. Suspension system 1 includes a pair of hanger brackets 5 welded to a slider frame 6A which includes a pair of parallel and spaced-apart slide channels 6 and a single hanger bracket 18 positioned intermediate brackets 5, and supported from a transverse beam 7 extending between slide channels 6. Slide channels 6 are spaced apart a distance equal to the distance between frame rails 4 and are mounted to frame rails 4 with a plurality of spring loaded pins. Suspension system 1 includes a forward suspension 10 and a rearward suspension 11 for supporting a forward axle 12 and a rearward axle 13, respectively. Each axle 12 and 13 supports a tire-wheel assembly 9 at each end thereof.

Inasmuch as both the forward and rearward suspensions 10 and 11 are similar, with the forward suspension 10 being merely reversed from the rearward suspension 11 with respect to hanger brackets 5, only forward suspension 10 will be described in detail. Forward suspension 10 includes a pair of parallel and spaced apart control arms 14 pivotally mounted to respective hanger brackets 5 at corresponding pivots 16 as well as a single torque arm 15 pivotally mounted to single hanger bracket 18 at a pivot 17. The ends of each control arm 14 (FIGS. 1–4) include a mounting boss 35 formed with a hole 36. While mounting boss 35 may have a variety of configurations, a steel tube is envisioned in the preferred embodiment.

Forward suspension 10 further includes a pair of spaced-apart axle seats 20 (FIGS. 1 and 2) from which axle 12 depends. An intermediate bracket 19 is positioned intermediate axle seats 20 and is welded to axle 12. Torque arm 15 connects to intermediate bracket 19 at a pivot 21. One control arm 14 attaches to each axle seat 20 at a pivot 23. One hanger bracket 5, control arm 14, torque arm 15 and intermediate bracket 19, in conjunction with axle 12 and axle seat 20, thus from a kinematic parallelogram indicated generally at 24 on FIG. 1. A shock absorber 100 extends between a transverse beam 101 and intermediate bracket 19, which is secured to axle 12, to dampen the movement of axle 13.

An air spring 25 is mounted between each axle seat 20 and a spring mounting plate 22 (FIGS. 2 and 3) adjacent a slide channel 6 by any convenient attachment means, such as bolts 26, shown in FIGS. 1 and 3.

In accordance with one of the main features of the present invention, each pivot 16 and 23 (FIG. 4) includes a flexible rubber bushing 28 formed with a hole 29. Rubber bushing 28 is bonded to an inner sleeve 28A and is press-fit within a hole 36, formed in each mounting boss 35 of control arm 14. Pivots 16 and 23 also include a pivot bolt or pin 30 which is fitted into inner sleeve 28A in hole 29 of flexible bushing 28 and clamps the ends of the bushing inner sleeve 28A to prevent rotation of pin 30 within sleeve 28A. Inasmuch as a pivot pin 30 is fitted into each bushing 28, and each bushing 28 is press-fit into control arm 14, any movement between control arm 14 and pivot pins 30 occurs as a result of distortion in flexible bushings 28. Bushings 28 provide relatively little lateral deflection in the range of 0.12 inches to 0.25 inches. Pivots 17 and 21 are also fitted with bushings.

Figure 4:
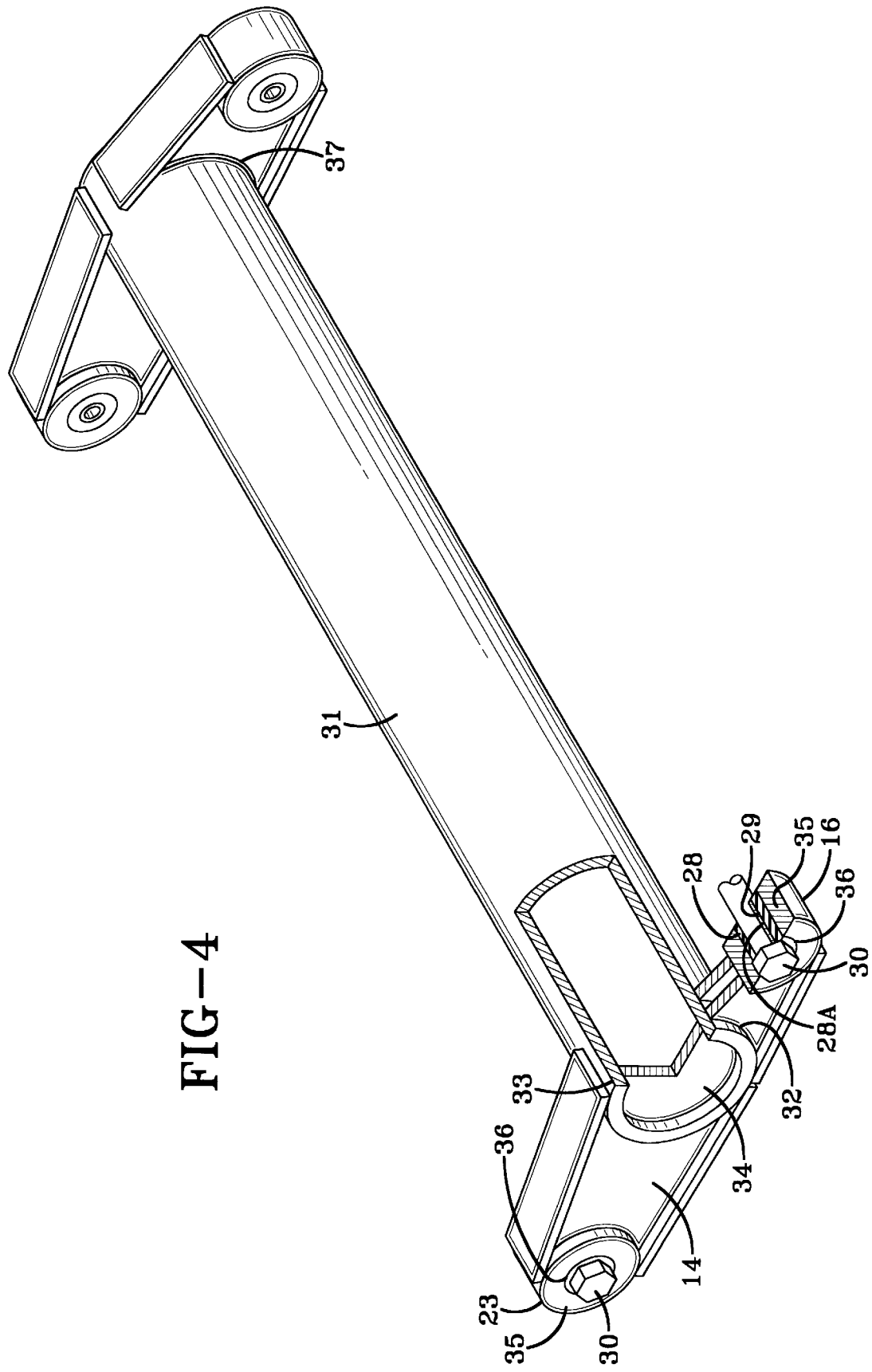
FIG. 4 is a perspective view of the control arms and stabilizer bar of a first embodiment of the invention with one of the control arms and the stabilizer bar shown in partial section.

In accordance with another of the main features of the invention, a tubular stabilizer bar 31 extends between spaced apart control arms 14, and is perpendicular to slide channels 6 and is formed with a pair of ends 33. Referring to FIG. 4, each control arm 14 is formed with a through hole 32 which accepts one end 33 of stabilizer bar 31 and is capped with a cover plate 34. A weld 37 extends around stabilizer bar 31 adjacent each hole 32. Bushings 28 and stabilizer bar 31 combine to provide a roll stable suspension resistant to lateral deflection as is described in more detail below.

As set forth hereinabove, forward suspension 10 has been described in detail. As should be apparent to one of ordinary skill in the art, forward suspension 10 may be utilized when only a single axle vehicle suspension system 1 is required. However, if tandem axle arrangements are required, for example those arrangements utilized on known trailer vehicles, a forward suspension 10 is utilized in combination with rearward suspension 11 as shown specifically in FIG. 1. Rearward suspension 11 is reversed from forward suspension 10 with respect to hanger bracket 5. In this manner, the overall length of the tandem unit may be significantly reduced when compared to standard tandem trailing arm suspensions which cannot be reversed, and existing parallelogram stabilized suspensions wherein the rearward suspension 11 is not reversed.

Having now described the improved vehicle suspension system 1, the method of operation will be described in detail.

When vehicle 2 is moving in a straight line and tire-wheel assemblies 9 at opposite sides of vehicle 2, roll over similar irregularities, there is no significant differential vertical movement between the respective parallelograms 24 supporting axle 12. Forces in suspension system 1 are controlled primarily by air springs 25, with minor lateral forces being controlled by pivots 16, 17, 21 and 23 between the members of parallelogram 24.

However, the forces act differently on suspension system 1 when vehicle 2 encounters road conditions which cause differential vertical swinging of control arms 14 attached to common axle 12. Differential vertical swinging of control arms 14 occurs when vehicle 2 negotiates a turn or when one tire-wheel assembly 9 traverse a bump or depression while the opposite tire-wheel assembly 9 passes over an unlike surface. Absent stabilizer bar 31, pivotal connections 16, 17, 21 and 23 would not provide sufficient roll stability for the vehicle. Stabilizer bar 31 increases roll stability by resisting the tendency of parallelogram 24 to roll relative to frame rails 4. When vehicle 2 traverses an irregularity in the road, the force from the irregularity will cause one tire-wheel assembly 9 to raise toward the vehicle. As tire-wheel assembly 9 raises, one parallelogram 24 will pivot upwardly and will transmit force to the opposing parallelogram 24, causing a downward force to act thereon. The associated movement of respective control arms 14 will twist stabilizer bar 31 in torsion which will resist the twisting. Consequently, stabilizer bar 31 resists the displacement of control arms 14 to increase the roll stability of vehicle 2. Similarly, as vehicle 2 negotiates a turn, cargo box 3 will tend to rotate out of the turn applying opposite forces on the suspension which will similarly apply torsion to stabilizer bar 31, thereby resisting the rotation of the cargo box relative to the ground surface.

Lateral forces also act on suspension system 1 when vehicle 2 negotiates a turn which will tend to deflect the parallelogram in a horizontal direction transversely with respect to frame rails 4 which distorts control arms 14, and torque arms 15 out of the usual planar configuration. Parallelogram 24 offers little resistance to lateral deflection with the only resistance being offered by flexible bushings 28 at pivots 16, 17, 21 and 23. Stabilizer bar 31 primarily resists this movement in the improved suspension. Specifically, as the vehicle negotiates a turn, the lateral forces will cause each parallelogram 24 positioned on opposite sides of the axle to distort, applying a moment to each end of stabilizer bar 31 which is rigidly attached to control arms 14. The amount of lateral deflection permitted by stabilizer bar 31 is directly proportional to its modulus and size. As such, when lateral forces act on suspension system 1, a portion of stabilizer bar 31 is in tension, and a portion is in compression urging stabilizer bar 31 to assume a sinusoidal configuration.

Figure 9:
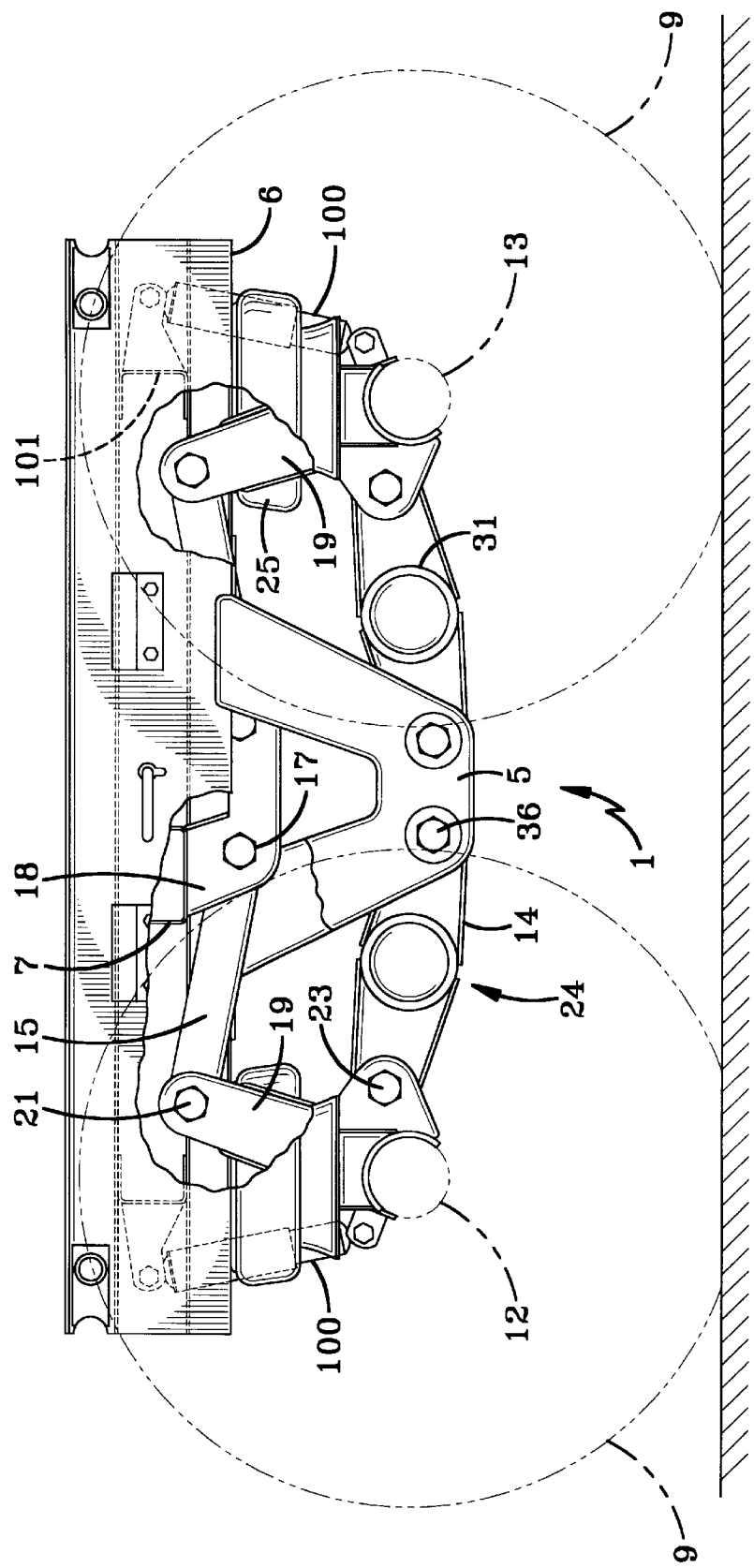
FIG. 9 is a side elevational view of the suspension of the present invention shown in the coupling mode, with portions broken away and in section, and with the tires in dot-dash lines.

Referring to FIG. 9, the suspension system 1 of the present invention is shown with the air springs 25 in the compressed position which may occur for example, when the vehicle traverses uneven terrain. Conversely, FIG. 10 depicts suspension system 1 when tire wheel assemblies 9 extend into a hole or culvert, usually occurring in off-the-road conditions.

Having now described the structure and operation of the first embodiment, only those portions of the remaining embodiments which are different from the first embodiment are described in detail. Likewise, similar numerals refer to similar parts throughout the various embodiments.

Figure 5:
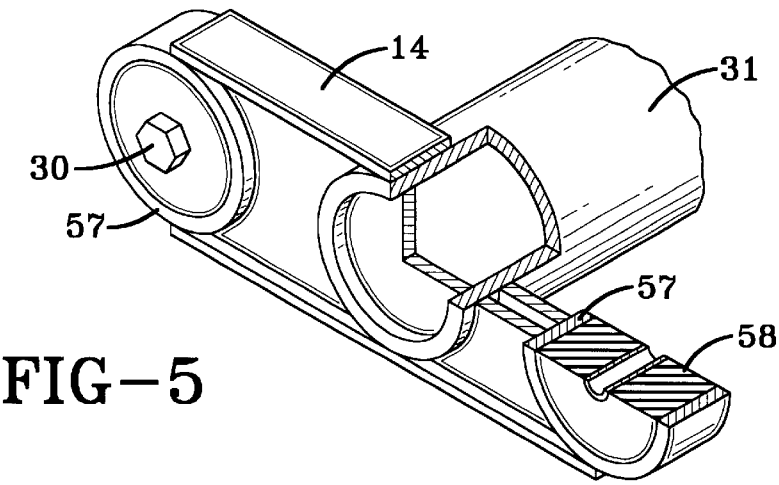
FIG. 5 is a fragmentary perspective view of one control arm, and the stabilizer bar of a second embodiment, with portions broken away and in section.

In accordance with a second embodiment of the invention shown specifically in FIG. 5, stabilizer bar 31 is rigidly attached to control arms 14 similar to the first embodiment. Each control arm 14 includes a pair of annular mounting bosses 57 which are larger than mounting bosses 35 of the first embodiment. Each pivot 16 and 23 also includes one bushing 58, larger than bushing 28. Bushing 58 is interferencely fitted into each mounting boss 57, with a pivot pin 30 fitted into each bushing 58. Bushings 58 provide larger lateral deflection in the range of 0.3 inches to 0.6 inches. As such, the only movement at pivots 16 and 23 between control arm 14 and pivot pin 30, occurs from the deflection of bushings 58. The hardness or durometer of bushings 58 may thus be varied to provide sufficient flexibility to create a roll stable suspension. Specifically, as vehicle 2 becomes roll unstable, forces acting on tire-wheel assemblies 9 are transferred to axle 12 and consequently to interconnected control arms 14. Inasmuch as stabilizer bar 31 may be too rigid to allow sufficient operable deflection to provide a functional roll stable suspension with sufficient compliance under certain loading conditions, the forces acting on control arm 14 are transmitted to enlarged bushings 58 which will provide sufficient deflection to stabilize vehicle suspension system 1 by allowing practical vehicle suspension articulations.

Figure 6:
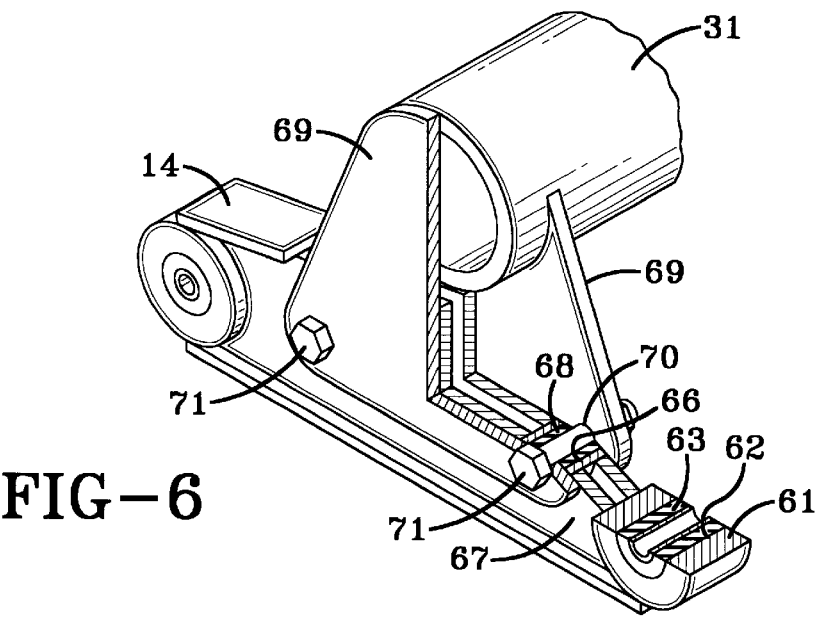
FIG. 6 is a fragmentary perspective view of one control arm and the stabilizer bar of a third embodiment with portions broken away and in section.

A third embodiment of the present invention is shown specifically in FIG. 6. Each control arm 14 includes mounting bosses 61 which are formed with a hole 62, similar to the bushings of the first and second embodiments. An elastomeric bushing 63 is mounted within hole 62 and may be of a variety of sizes. Control arm 14 also includes two spaced apart holes 66 formed in a center web portion 67 of control arm 14, and an elastomeric bushing 68 is positioned in each hole 66. A plurality of flanges 69 depend from stabilizer bar 31 and are formed with a plurality of spaced apart and axially aligned holes 70, which are also axially aligned with holes 66. A bolt 71 extends through each pair of aligned holes 66 and 70, and has an outer diameter substantially equal to the inner diameter of bushing 68.

The size, flexibility and spacing of bushings 63 and 68 may be varied to alter the roll stability of vehicle suspension system 1. The spacing of bolts 71 also may be varied to increase or decrease the effectiveness of stabilizer bar 31. As bolts 71 are moved further apart, suspension system 1 becomes increasingly resistant to roll, and lateral stresses. Conversely, as bolts 71 are moved closer together, suspension system 1 becomes less resistant to lateral stress and forces caused by vehicle roll.

Figure 7:
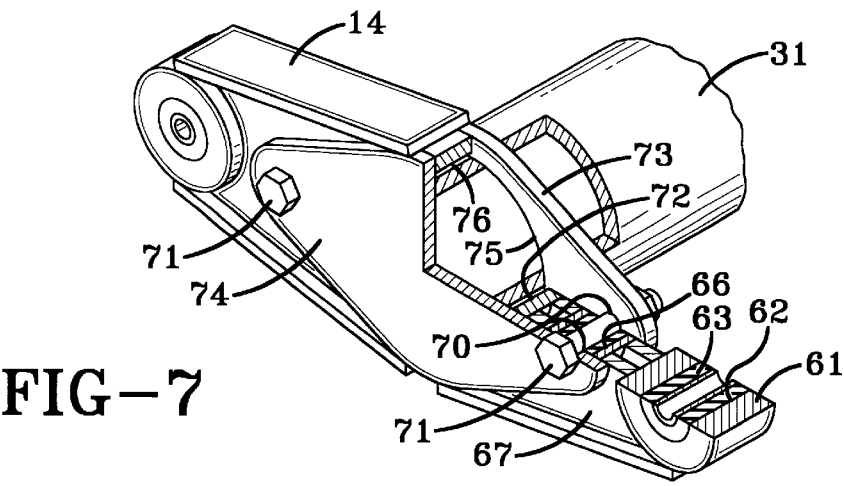
FIG. 7 is a fragmentary perspective view of one control arm and the stabilizer bar of a fourth embodiment with portions broken away and in section.

FIG. 7 discloses a fourth embodiment. In this embodiment, each control arm 14 includes mounting bosses 61 and holes 62. Pivots 16 and 23 include bushings 63. Moreover, similar to the third embodiment, two spaced apart holes 66 are formed in center web portion 67 of control arm 14 and bushings 68 extend through holes 66. A larger hole 72 is also formed in center web portion 67 which is somewhat larger in diameter than tubular stabilizer bar 31. An inner flange 73 is formed with a hole 75 and is welded to stabilizer bar 31. Holes 72 and 75 are axially aligned to permit stabilizer bar 31 to extend therethrough. An outer flange 74 is welded to the end of stabilizer bar 31 on an opposite side of center web portion 67 as inner flange 73. Flanges 73 and 74 are each formed with a plurality of spaced apart holes 70 which are axially aligned with each other, and with holes 66 being formed in center web portion 67. Bolts 71 extend through corresponding holes 66 and 70 to secure stabilizer bar 31 in position. An air space 76 extends circumferentially between stabilizer bar 31 and center web portion 67 to prevent corrosive contact therebetween. Similar to the third embodiment, the size and modulus of elasticity of bushings 63 may be varied to increase or decrease the roll stiffness of vehicle suspension system 1. Moreover, the positioning of bolts 70 may be varied to increase or decrease the reactivity of stabilizer bar 31 to lateral forces, and forces associated with vehicle roll.

Figure 8:
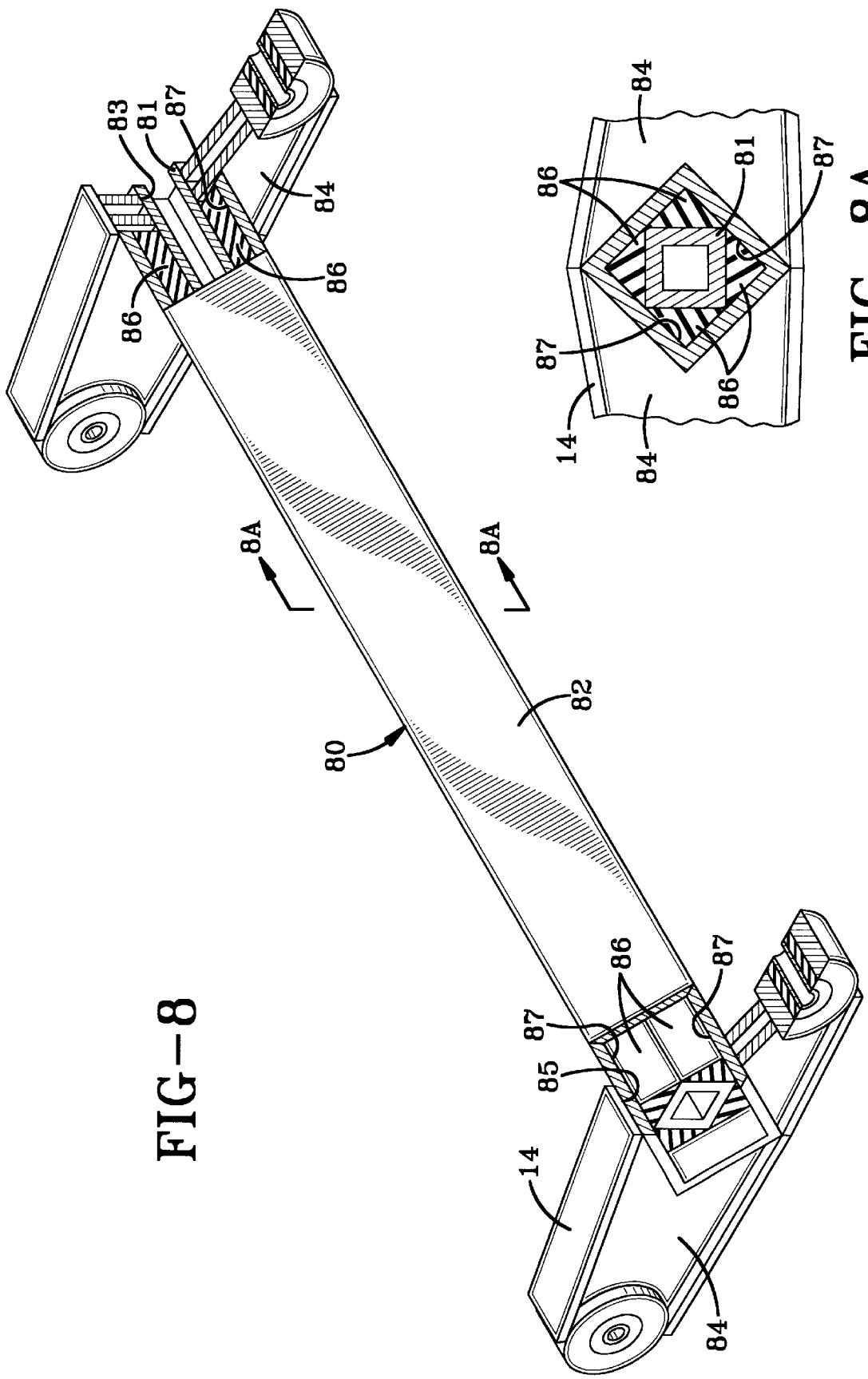
FIG. 8 is a perspective view of the control arms and stabilizer bar of a fifth embodiment of the invention shown in partial section.

The fifth embodiment of the invention is shown specifically in FIG. 8 and includes a rectangular, preferably square, stabilizer bar 80. In accordance with the invention, stabilizer bar 80 includes a square-shaped inner portion 81 coaxially located within, and a hollow square-shaped outer portion 82. When inner portion 81 is rotated 45 degrees with respect to outer portion 82, it telescopically extends into hollow outer portion 82. Inner portion 81 extends through a complementarily shaped square hole 83 formed in a web portion 84 of one control arm 14. Similarly, outer portion 82 extends through a complementarily shaped hole 85 formed in a web portion 85 of the other control arm 14. A wedge-shaped bushing 86 extends along each of a plurality of wedge-shaped voids 87 created by the telescopically engaged inner and outer portions 81 and 82. Similar to the previously discussed embodiments, each control arm 14 includes mounting bosses 61, holes 62, and each pivot 16 and 23 includes bushing 63.

In operation, as stabilizer bar 80 is subject to lateral force and forces as a result of vehicle roll, bushings 86 will deflect to permit movement of inner portion 81 with respect to outer portion 82. The modulus of elasticity of both bushings 86 within stabilizer bar 80 and bushings 63 at pivots 16 and 23, may be varied to increase or decrease the reactivity of stabilizer bar 31 to lateral forces, and other forces associated with vehicle roll.

In summary, vehicle suspension system 1 provides a parallelogram stabilized axle 12 with all the advantages known in the art, while still providing a suspension that is resistent to lateral forces and is roll stable. Parallelogram 24 operates such that as tire-wheel assemblies 9 move into and out of a ground engaging position, control arm 14 and torque arm 15 pivot in unison to maintain axle 12 at a constant angle with respect to frame rails 4. Similarly, inasmuch as axle 12 moves only a short distance axially between the lifted and non-lifted positions, vehicle suspension system 1 will substantially reduce dock walk. Further, inasmuch as the angle of axle 12 is maintained relative to the vehicle, and the axle travels a short axial distance relative to the frame rails, substantially the entire capability of air spring 25 is utilized. Thus, stabilizer bar 31 enhances the lateral stability and roll stability of the parallelogram stabilized suspension.

Accordingly, the various embodiments described hereinabove, successfully overcome problems associated in the art, and create a parallelogram stabilized suspension, as well as a roll stable suspension. Moreover, the suspension system of the present invention also provides an air ride suspension system which is resistant to lateral deflection.

Accordingly, the improved vehicle suspension system is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved vehicle suspension system is constructed and used, the characteristics of the construction, and the advantageous, new and useful results obtained; the new and useful structures, devices, elements, arrangements, parts and combinations, are set forth in the appended claims.

I claim:

1. A vehicle suspension system for use with a vehicle having a frame and an axle comprising:

a pair of parallel and spaced apart parallelogram means for at least partially stabilizing an axle relative to a frame;

spring means for resiliently controlling the vertical movement of an axle relative to a frame;

a stabilizer bar having a first end and a second end extending between said pair of parallelogram means;

mounting means for mounting each of said first and second ends of said stabilizer bar to a respective parallelogram means;

said stabilizer bar including a first hollow tube having at least one flat side, and a second hollow tube telescopically mounted within the first tube; and flexible bushing means interposed between the first and second tubes for providing relative rotational movement therebetween.

2. A vehicle suspension system as defined in claim 1 in which a hanger bracket and one control arm form one half of each of the parallelogram means; and in which a first intermediate bracket adapted to extend from the axle and a torque arm attached to said intermediate bracket form a common second half of each of the parallelogram means.

3. A vehicle suspension system as defined in claim 2 in which each of the control arms has first and second ends; in which a first pivot mounts the first end of the control arm to its respective hanger bracket; and in which a second pivot mounts the second end of the control arm to one of a pair of axle seats.

4. A vehicle suspension system as defined in claim 3 in which the torque arm includes first and second ends; in which a third pivot mounts the first end of the torque arm to the first intermediate bracket; and in which the second end of the torque arm is adapted to be pivotally attached to the frame.

5. A vehicle suspension system as defined in claim 4 including a second intermediate bracket adapted to depend from the frame and a fourth pivot which pivotally connects the second end of the torque arm to the frame.

6. A suspension system as defined in claim 5 in which the first intermediate bracket is equally spaced between the axle seats.

7. A suspension system as defined in claim 5 in which the second intermediate bracket is equally spaced between the hanger brackets.

8. A suspension system as defined in claim 2 in which the torque arm is aligned with a longitudinal axis of the vehicle, and intermediate the control arms.

9. A suspension system as defined in claim 1 in which the spring means is a pair of air springs.

10. A suspension system as defined in claim 1 in which the stabilizer bar is a hollow tube; and in which the first and second ends of said stabilizer bar are open.

11. A suspension assembly as defined in claim 1 including a shock absorber which is adapted to extend between the axle and the frame.

12. A suspension system as defined in claim 1 in which one control arm is formed with a first hole complementary to the first tube which is mounted therein; and in which the other control arm is formed with a hole complementary to the second tube which is mounted therein.

13. A suspension system as defined in claim 12 in which the first and second tubes have a first pair and a second pair of parallel and spaced apart walls; in which the first pair is normal to the second pair and in which the walls of the inner tube are non-parallel with respect to the walls of the outer tube.

14. A tandem vehicle suspension system for use with a vehicle having a frame and an axle comprising a forward suspension system and a rearward suspension system, both the forward and rearward suspension system including:

- a pair of parallel and spaced apart parallelogram means for at least partially stabilizing an axle relative to a frame;
- spring means for resiliently controlling the vertical movement of an axle relative to a frame;
- a stabilizer bar having a first end and a second end extending between said pair of parallelogram means;
- mounting means for mounting each of said first and second ends of said stabilizer bar to a respective parallelogram means;
- said stabilizer bar including a first hollow tube having at least one flat side, and a second hollow tube telescopically mounted within the first tube; and
- flexible bushing means interposed between the first and second tubes for providing relative rotational movement therebetween.

15. A tandem vehicle suspension system as defined in claim 14 in which a pair of spaced apart hanger brackets extend from a frame; in which one of the pair of spaced apart parallelogram means from each of the forward and rearward suspensions attaches to each of said pair of hanger brackets.

* * * * *